US011655602B2

(12) United States Patent
Lim

(10) Patent No.: US 11,655,602 B2
(45) Date of Patent: *May 23, 2023

(54) CRASH CUSHION WITH IMPROVED SIDE PANEL ATTACHMENT

(71) Applicant: Lindsay Transportation Solutions, LLC, Omaha, NE (US)

(72) Inventor: Jason Lim, Rio Vista, CA (US)

(73) Assignee: Lindsay Transportation Solutions, LLC, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,262

(22) Filed: Jan. 25, 2022

(65) Prior Publication Data

US 2022/0144198 A1 May 12, 2022

Related U.S. Application Data

(63) Continuation of application No. 16/849,183, filed on Apr. 15, 2020, now Pat. No. 11,268,250.

(51) Int. Cl.
*E01F 15/14* (2006.01)
*B60R 19/56* (2006.01)

(52) U.S. Cl.
CPC ............ *E01F 15/146* (2013.01); *B60R 19/56* (2013.01)

(58) Field of Classification Search
CPC ............................... E01F 15/146; B60R 19/56

USPC ........................................................ 404/6–11
See application file for complete search history.

(56) References Cited

U.S. PATENT DOCUMENTS

| | | | | |
|---|---|---|---|---|
| 6,116,805 | A * | 9/2000 | Gertz ................. | E01F 15/0476 404/6 |
| 7,396,184 | B2 * | 7/2008 | La Turner ............ | E01F 15/146 404/9 |
| 8,491,216 | B2 * | 7/2013 | Dyke .................... | E01F 15/146 404/6 |
| 9,051,698 | B1 * | 6/2015 | Anghileri ............. | E01F 15/146 |
| 2005/0063777 | A1 * | 3/2005 | Smith ................... | E01F 15/146 404/6 |
| 2011/0091273 | A1 * | 4/2011 | Sayre ................ | C08G 18/3215 404/6 |
| 2011/0255916 | A1 * | 10/2011 | Thompson ........... | E01F 15/145 404/6 |
| 2012/0121325 | A1 * | 5/2012 | Buehler ............... | E01F 15/146 404/6 |
| 2021/0108383 | A1 * | 4/2021 | Maus ................. | E01F 15/0423 |

\* cited by examiner

*Primary Examiner* — Raymond W Addie
(74) *Attorney, Agent, or Firm* — Hovey Williams LLP

(57) ABSTRACT

A crash cushion includes a number of spaced-apart supports or bulkheads; energy-absorbing modules positioned between the supports; overlapping side panels that interconnect the supports; front and rear fixed anchors; and reinforcing cables extending between the anchors. The crash cushion also includes indexing structure that permits each hinge to be selectively mounted in several different positions with respect to its support; angle set structure that allows the hinges to pivot relative to the supports up to a defined pivot range.

18 Claims, 15 Drawing Sheets

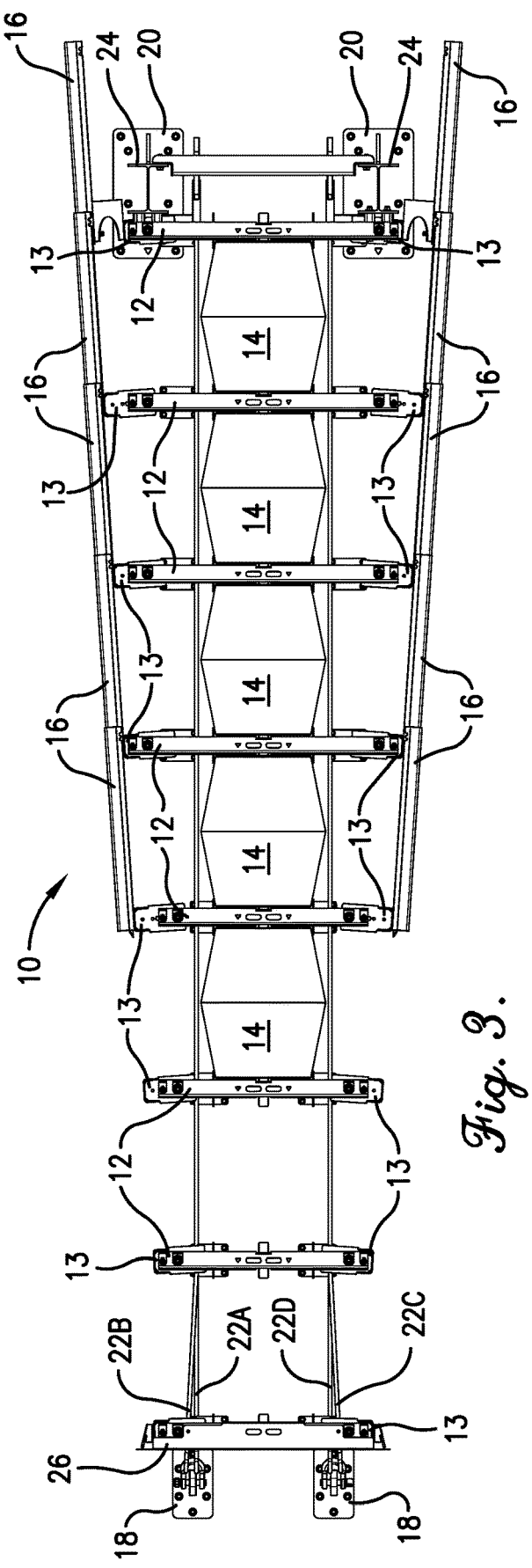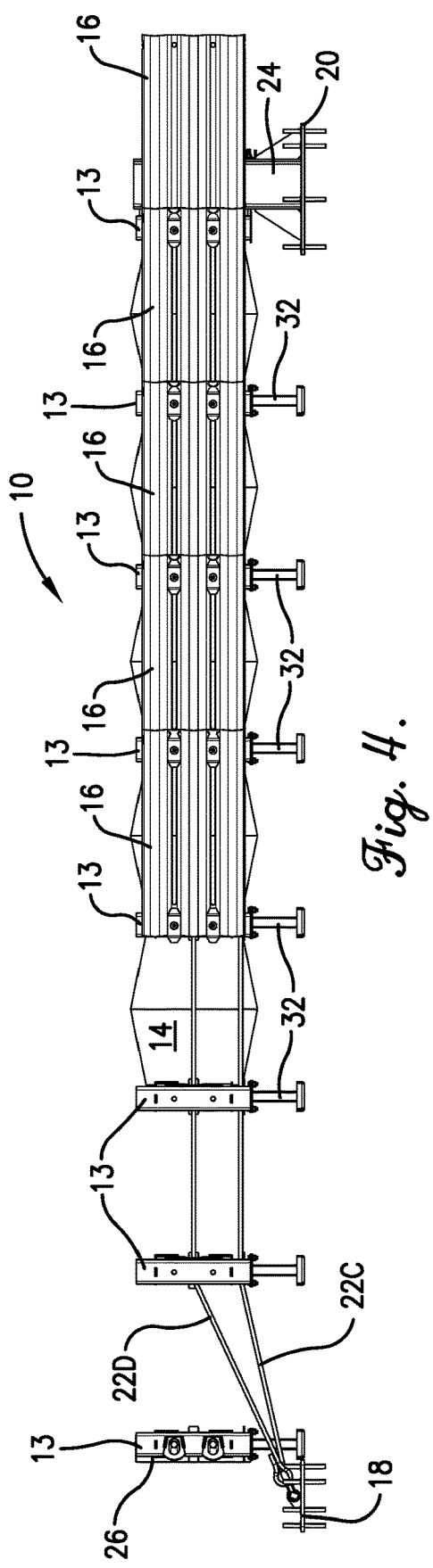

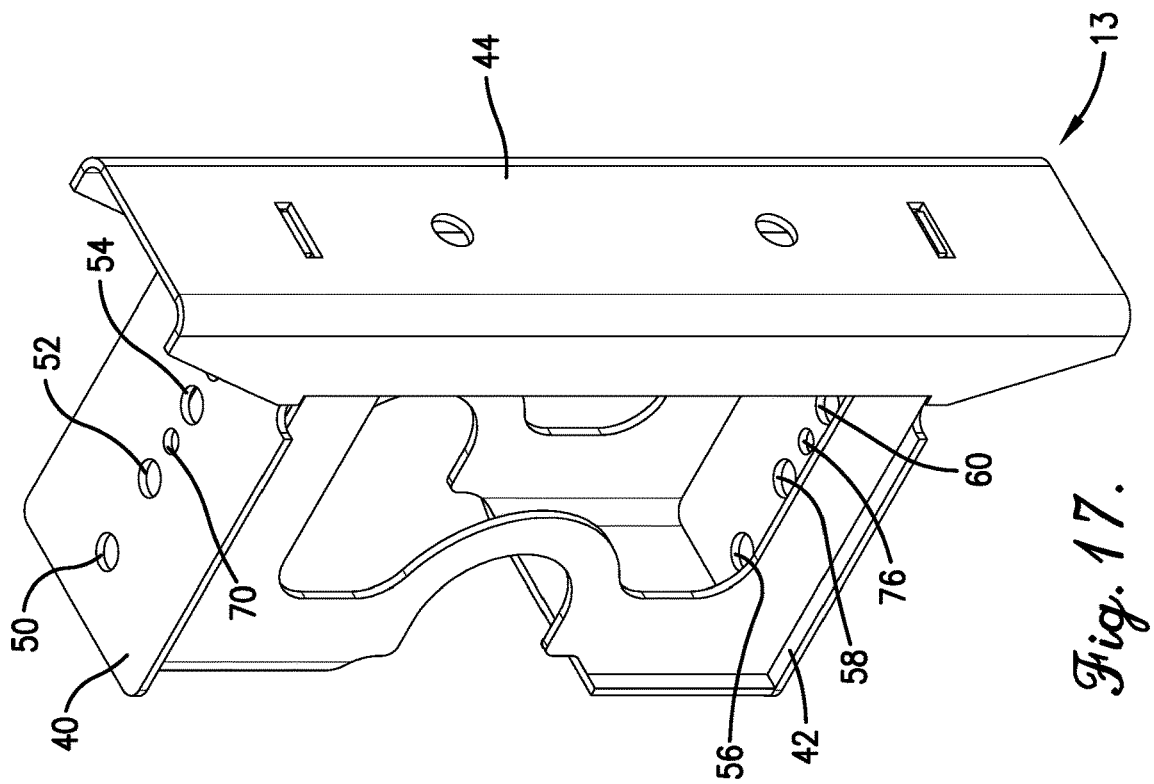
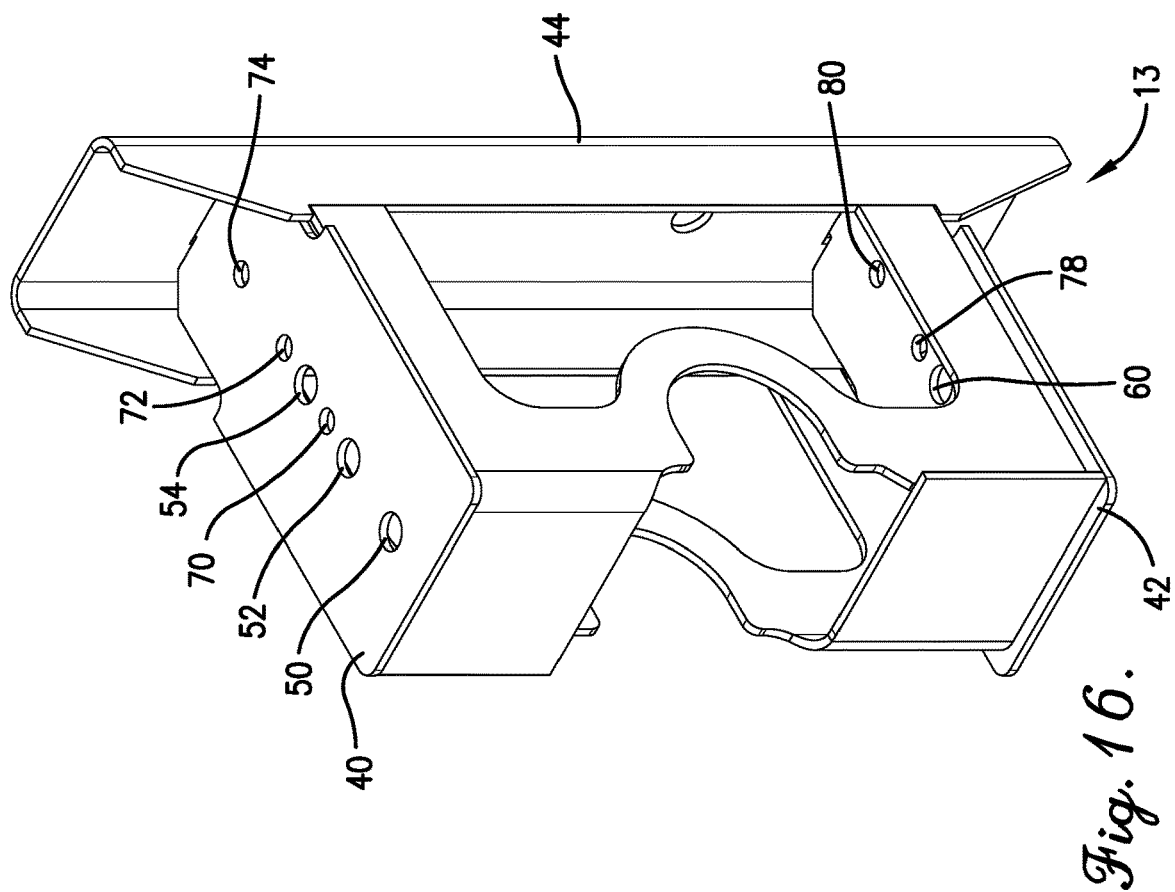

CRASH CUSHION WITH IMPROVED SIDE PANEL ATTACHMENT

RELATED APPLICATION

This patent application is a continuation, and claims priority benefit with regard to all common subject matter, of earlier-filed U.S. patent application Ser. No. 16/849,183, filed on Apr. 15, 2020, and entitled "CRASH CUSHION WITH IMPROVED SIDE PANEL ATTACHMENT" which is hereby incorporated by reference in its entirety into the present application.

BACKGROUND

Vehicle impact absorbing systems, also called "crash cushions," are often installed adjacent rigid structures such as pillars, bridge abutments, lighting poles and the like for absorbing vehicle impact energy and minimizing the effects of impact on a vehicle, the vehicle's occupants, and the structure being protected.

One type of crash cushion includes a number of spaced-apart supports or bulkheads, energy-absorbing modules positioned between the supports, overlapping side panels that interconnect the supports and envelop the energy-absorbing modules; and reinforcing cables that are clamped below the supports/bulkheads. This type of crash cushion is designed to collapse upon itself in an accordion or telescoping fashion when subjected to a frontal vehicle impact so as to transfer and absorb vehicle impact energy over a predetermined distance and to redirect a vehicle away from the crash cushion and the rigid structure being protected when subjected to a side vehicle impact.

Such crash cushions are often configured in a wedge shape (in plan view), with their narrower ends at the front to present a smaller initial obstacle and their wider ends at the rear to provide the most crash protection near the structures being protected. But configuring a crash cushion this way requires each support to be of a different width, with the narrowest support up front and the widest support at the rear, increasing design, fabrication, and installation costs. The wedge shape also inhibits sliding and stacking of the side panels when the crash cushion collapses after a fontal vehicle impact.

SUMMARY

The present invention solves the above-described problems and other related problems by providing a crash cushion with an improved side panel attachment system that reduces the number of unique width supports required and that facilitates the sliding and stacking of the side panels when the crash cushion collapses.

An embodiment of the crash cushion broadly comprises a number of spaced-apart supports; hinges mounted to the sides of the supports; energy-absorbing modules positioned between the supports; overlapping side panels attached to the hinges to interconnect the supports and envelop the energy-absorbing modules; a front anchor structure; a rear anchor structure; and reinforcing cables extending between the anchors and through the supports. The crash cushion may also comprise a substantially immovable support frame fixedly anchored in a rearmost position relative to the other spaced supports and a front impact member or nose located at the forward end of the crash cushion.

In accordance with one important aspect of the invention, the crash cushion also includes indexing structure that permits each hinge to be selectively mounted in several different positions with respect to its support. One embodiment of the indexing structure permits each hinge to be mounted in three different positions relative to its support: an innermost position closest to its support; an intermediate position; and an outermost position spaced furthest from its support. This reduces the number of unique width supports required. For example, three supports of the same width may each have three different effective widths by mounting hinges to the first support in their innermost positions, mounting hinges to the second support in their intermediate positions, and mounting hinges to the third support in their outermost positions.

In accordance with another important aspect of the invention, the crash cushion also includes angle set structure that allows the hinges to pivot relative to the supports up to a defined pivot range. This allows the side panels to more easily flare outwardly from front to back to create a wedge-shape and to accommodate the overlapping edges of the side panels. The angle set structure also facilitates controlled stacking of the side panels when the crash cushion collapses upon itself when subjected to a frontal vehicle impact.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 3 is a plan view of the crash cushion with some of its components removed.

FIG. 4 is a side view of the crash cushion with some of its components removed.

FIG. 16 is a rear perspective view of one of the hinges.

FIG. 17 is a front perspective view of one of the hinges.

Figure 1:
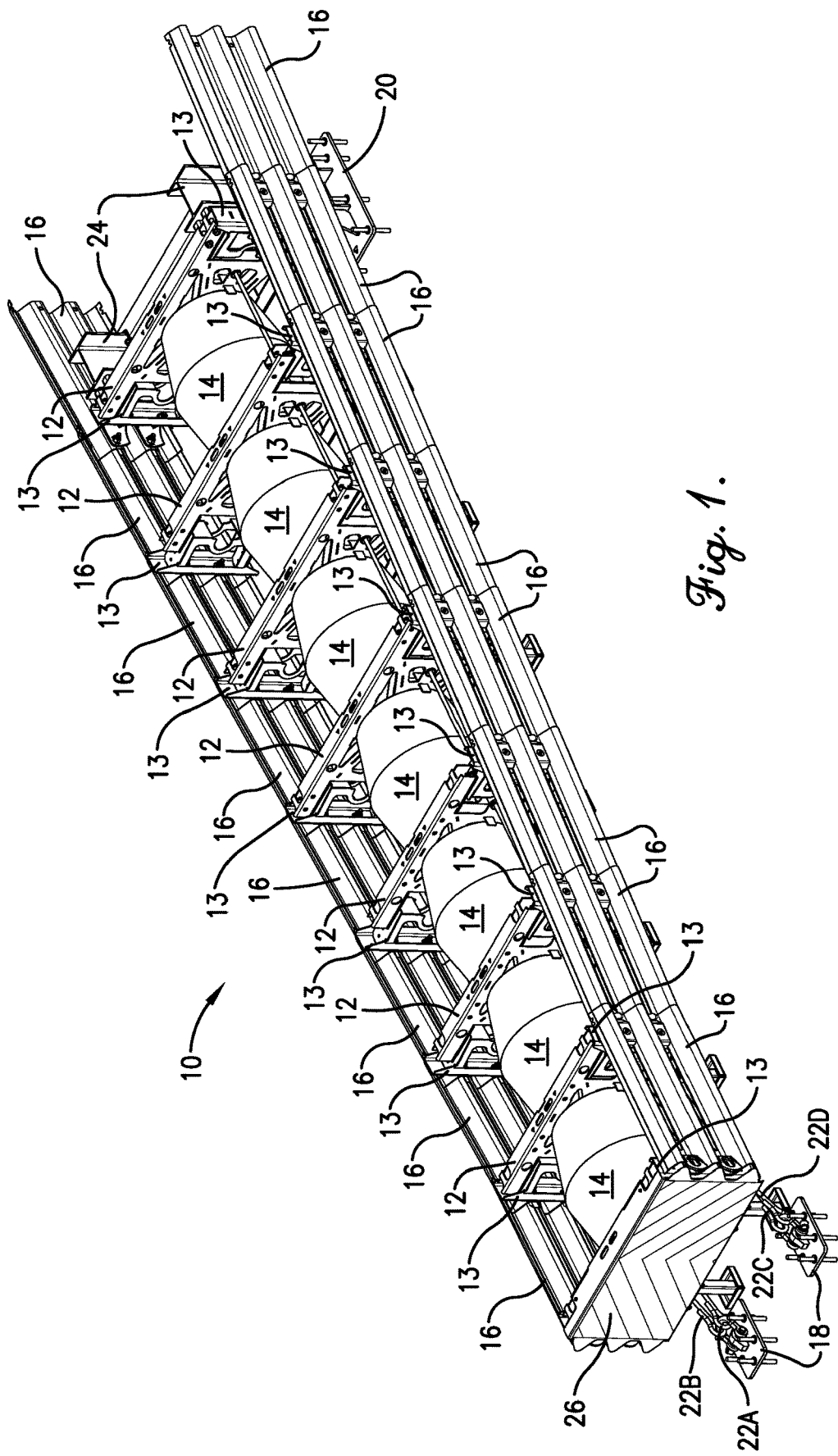
FIG. 1 is a top perspective view of a crash cushion constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

Turning now to the drawing figures, a crash cushion 10 constructed in accordance with embodiments of the invention is illustrated. The crash cushion 10 may be installed adjacent a rigid structure such as a pillar, bridge abutment, lighting pole, or the like for absorbing vehicle impact energy and minimizing the effects of impact on a vehicle, the vehicle's occupants and the structure being protected.

As best shown in FIG. 1, an embodiment of the crash cushion 10 broadly comprises a number of spaced-apart supports 12; hinges 13 mounted to the sides of the supports; energy absorbing modules 14 positioned between the supports 12; overlapping side panels 16 mounted to the hinges 13 on the supports 12; a front anchor structure 18; a rear anchor structure 20; and reinforcing cables 22A, 22B, 22C, 22D extending between the anchors 18, 20. The crash cushion 10 also includes a substantially immovable support frame 24 fixedly anchored to the rear anchor structure 20 in a rearmost position relative to the supports 12 and a front impact member or nose 26 located at the forward end of the crash cushion 10. Embodiments of each of these components will now be described in more detail.

The supports 12 are spaced along a longitudinal axis of the crash cushion 10 and, except for the support closest to the immoveable support frame 24, are configured to telescopically slide and collapse toward the immovable support frame 24 when the front impact member 26 is struck by a vehicle. The supports 12 also cooperate with other components of the crash cushion to redirect a vehicle away from the crash cushion and the structure being protected when either side of the crash cushion is struck by a vehicle.

The supports 12 may be of different widths, with the support at the front of the crash cushion being the narrowest and the support at the rear of the crash cushion being the widest. This allows the crash cushion to have a wedge-shape in plan view, widening from front to back, so as to present a relatively smaller obstacle at the front impact member 26 and a larger protected area next to the structure being protected. Aspects of the invention described below minimize the number of unique width supports needed to create this wedge shape.

Except for their widths, the supports 12 are identical, so only the one illustrated in FIG. 9 will be described in detail. As shown, the support 12 includes a central frame 28, a ground engaging component 32, and cable guide structures 34A, 34B, 34C, 34D integrated in the central frame 28.

The central frame 28 may be formed of metal or other suitable materials and stands upright about a generally vertical axis. In one embodiment, the central frame 28 is rectangular, but it may be formed in any shaped.

The ground engaging component 32 depends from the central frame 28 and supports the frame above a ground surface such as a road, sidewalk, or area near a pillar, bridge, etc. In one embodiment, the ground engaging component includes a pair of posts, each with a ground-contacting lower foot.

The integrated cable guides 34A, 34B, 34C, 34D guide the cables 22A, 22B, 22C, 22D between the anchors 18, 20 and allow relative slidable movement between the cables 22 and the supports 12 upon collapse of the crash cushion. In one embodiment, the support 12 includes four cable guides: a lower left side cable guide 34A, an upper left side cable guide 34B, a lower right side cable guide 34C, and an upper right side cable guide 34D.

Figure 9:
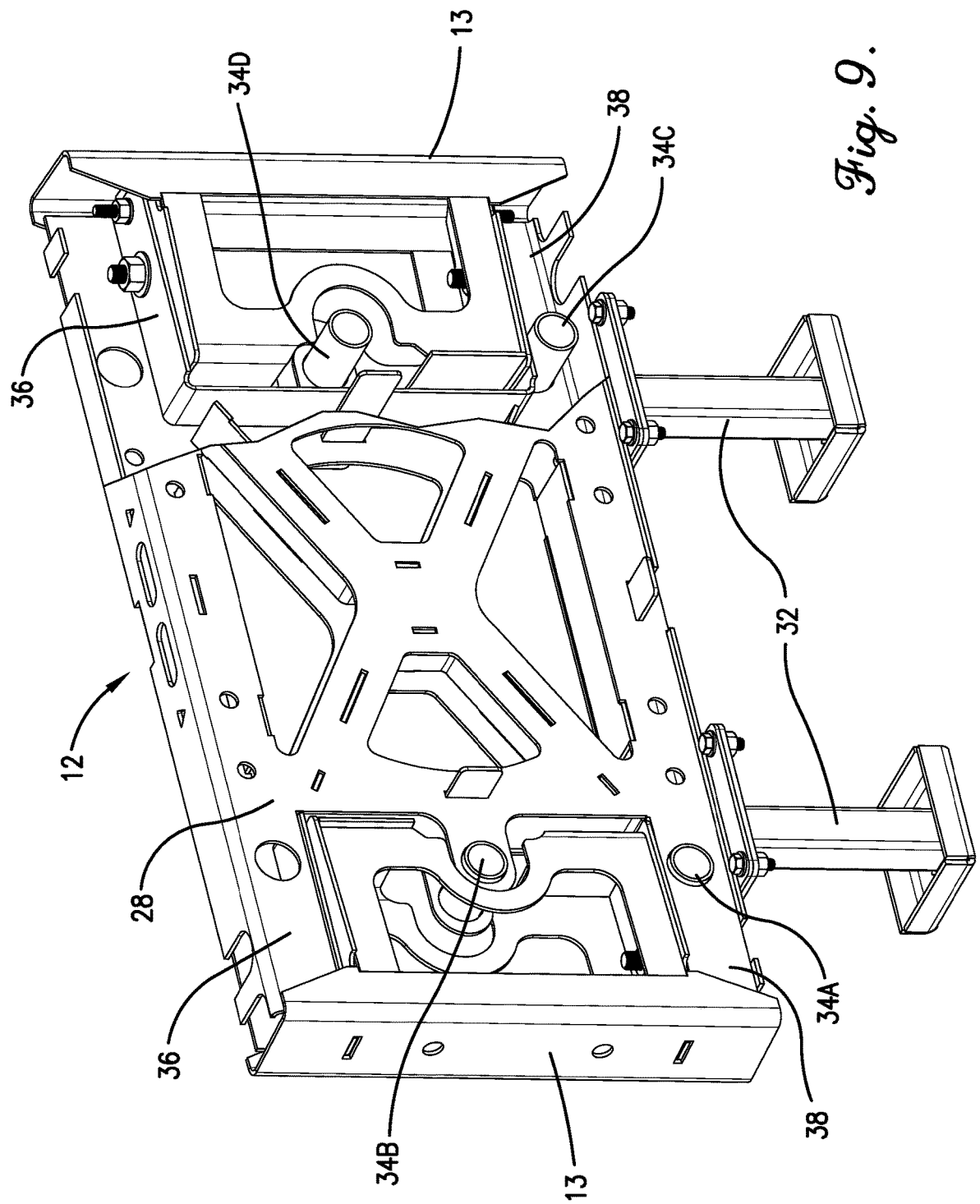
FIG. 9 is a perspective view of one of the supports of the crash cushion with portions removed to illustrate internal features of the support.
Figure 10:
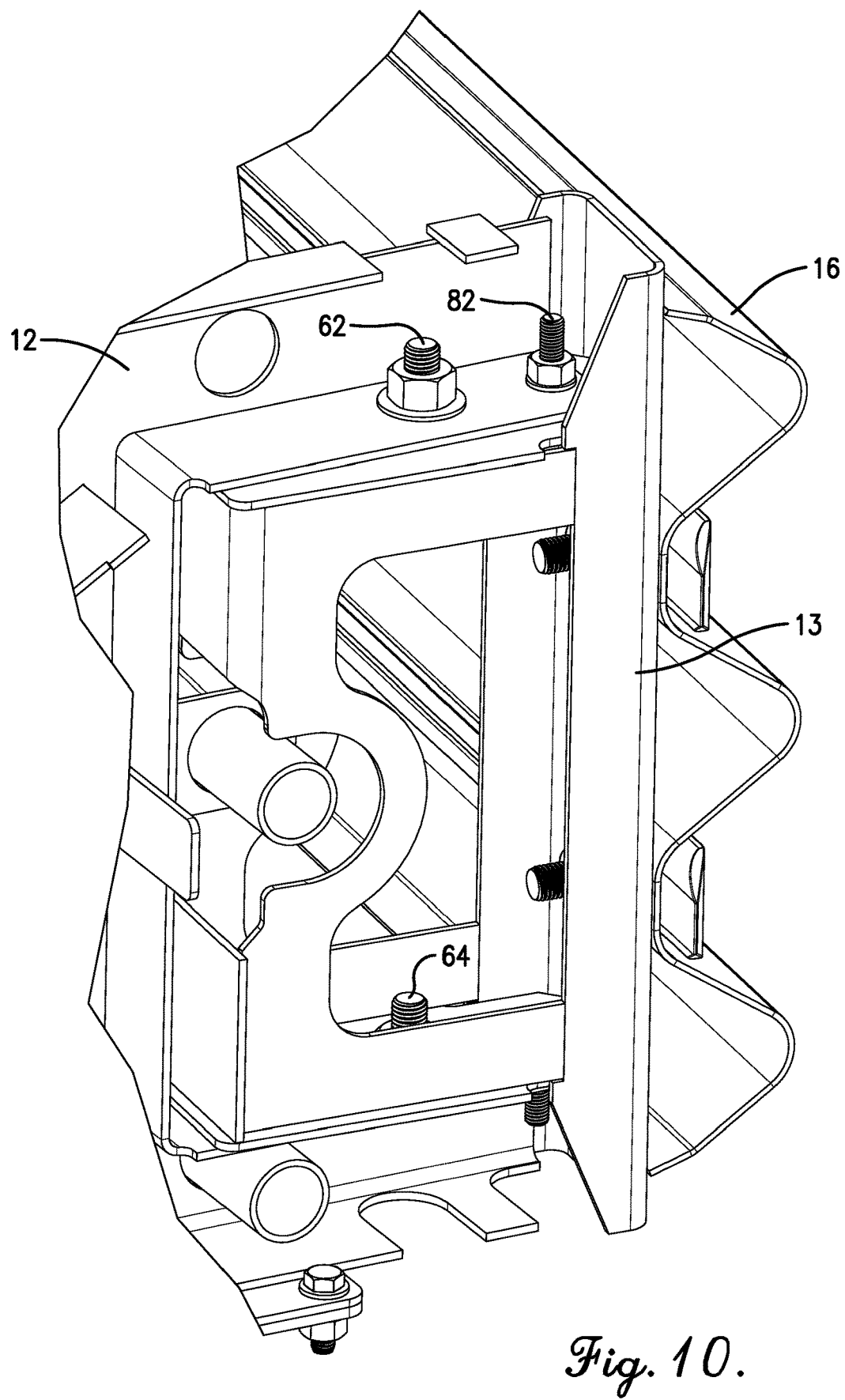
FIG. 10 is a partial perspective view of one of the hinges shown mounted to its support.
Figure 11:
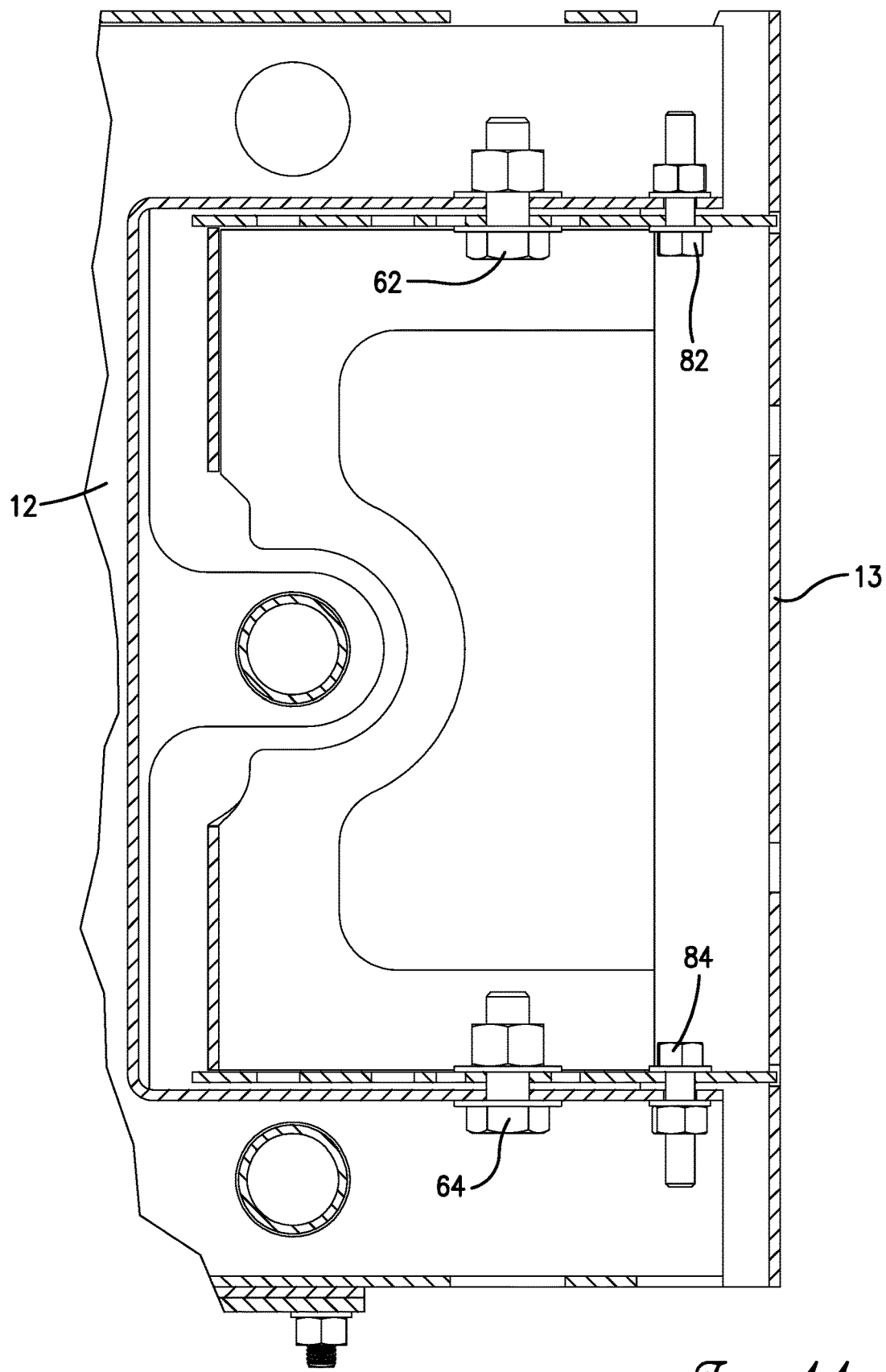
FIG. 11 is a vertical sectional view of one of the hinges shown mounted in an innermost position with respect to its support.
Figure 15:
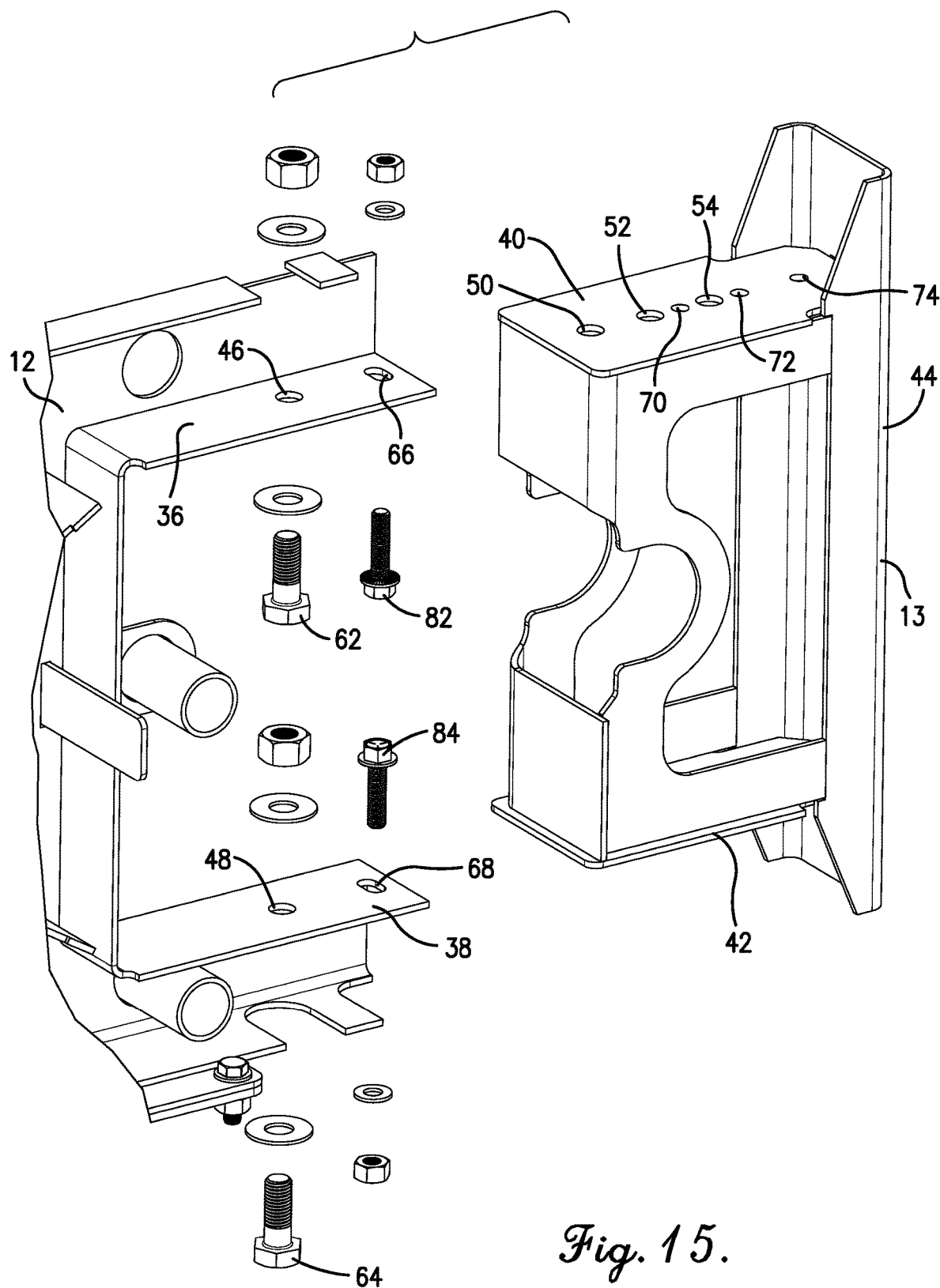
FIG. 15 is an exploded view of a portion of one of the supports, its associated hinge, and the indexing structure and angle set structure in the support and the hinge.

As best shown in FIGS. 9 and 15, each side of the central frame 28 has a pair of spaced-apart upper and lower hinge posts 36, 38. The hinge posts 36, 38 provide mounting surfaces for the hinges 13 as described below. The space between each pair of upper and lower hinge posts 36, 38 defines a hinge-receiving area for one of the hinges 13.

The hinges 13 provide attachment points for the side panels 16 and permit the ends of the side panels to pivot slightly. The pivoting of the hinges facilitates installation of the side panels and stacking of the side panels during collapse of the crash cushion as described in more detail below.

A hinge 13 is pivotally attached to each side of each support 12 as shown in FIG. 9. The hinges are identical, so only the hinge 13 illustrated in FIGS. 10-17 will be described in detail. The hinge 13 is positioned between, and pivotally coupled to, one pair of the upper and lower hinge posts 36, 38. In one embodiment, the hinge 13 includes an upper horizontally extending hinge mounting surface 40, a lower horizontally extending hinge mounting surface 42, and a vertically extending panel mounting surface 44. The hinge 13 is pivotally mounted between the upper and lower hinge posts 36, 38 of its support by inserting the hinge in the space between the hinge posts, aligning holes in the hinge posts 36, 38 with holes in the upper and lower hinge mounting surfaces 40, 42 of the hinge, and then inserting bolts, pins, or other fasteners in the aligned holes. Additional details of how the hinge 13 is attached to its support 12 are provided below.

The energy absorbing modules 14 are disposed between and supported by the supports 12 and the immovable support frame 24. In the illustrated embodiment, the modules 14 are aligned between the supports 12 along the longitudinal axis of the crash cushion, but they may be staggered or positioned anywhere between the supports. Any number of supports 12 and energy absorbing modules 14 may be provided to form a crash cushion of any desired length and crash rating.

In one embodiment, the energy absorbing modules 14 are formed of molded plastic or other similar materials and are filled with foam, water, or other liquid and/or gaseous materials. Some of the modules 14 may include elongated narrow openings or slots formed therein that define deformable side wall strips which bend responsive to application of opposed forces such as might be caused by a vehicle impacting the crash cushion 10. Similarly, some of the modules may include holes, which encourages creation of folds in the modules when subjected to vehicle impacts.

Figure 6:
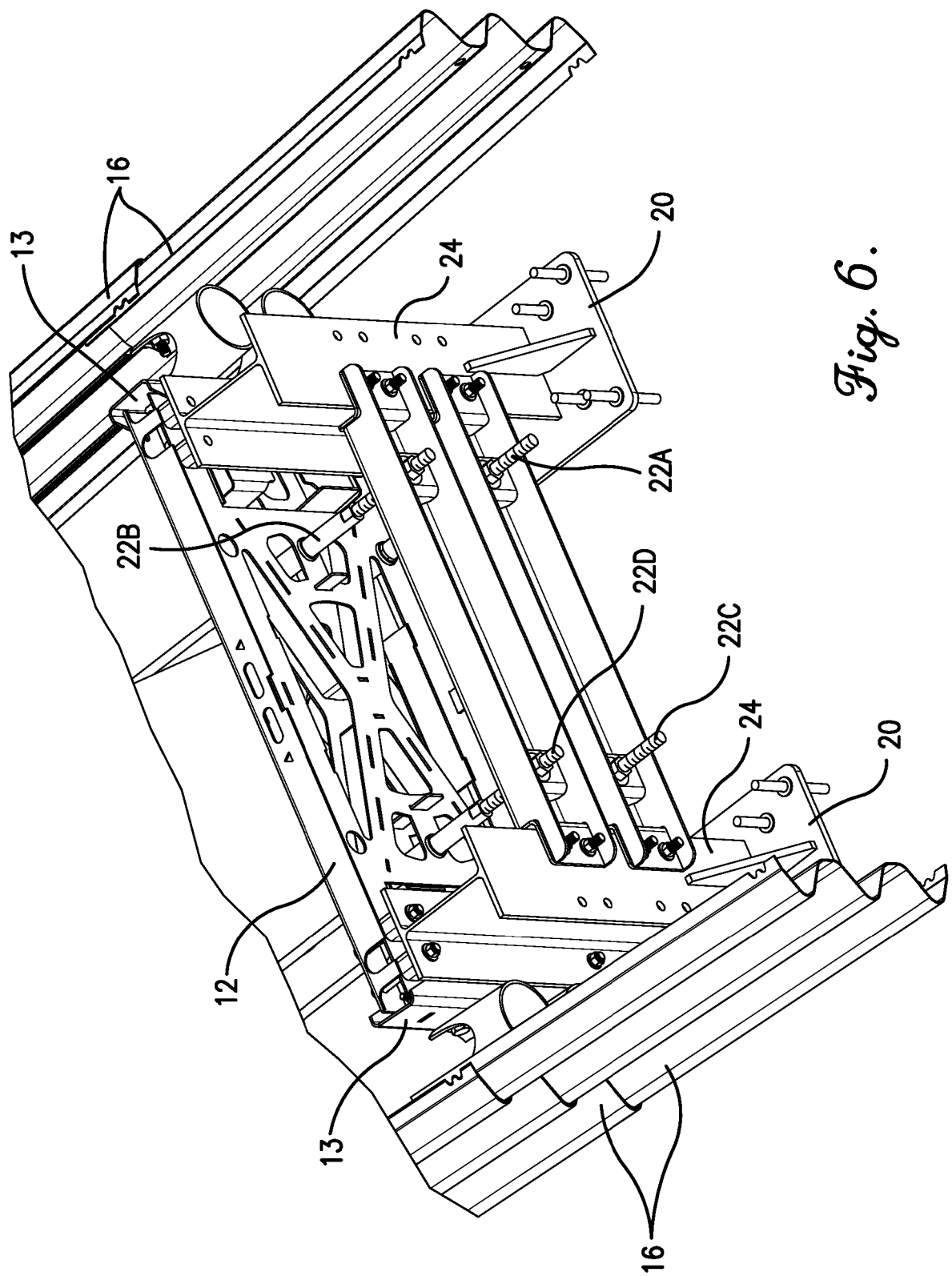
FIG. 6 is a partial top perspective view of a rear portion of the crash cushion with some of its components removed.

The side panels 16 are mounted to the hinges 13 on the supports 12. As best shown in FIGS. 3 and 6, the side panels 16 are arranged in an overlapping and telescoping fashion, with the rear edge of each side panel overlapping the front edge of the side panel behind it when viewed from the front of the crash cushion.

The front anchor structure 18 and rear anchor structure 20 are fixed in position and essentially immovable. The anchor structures may be bolted to blocks of concrete embedded in the ground. The immoveable support 24 is bolted to or otherwise fixedly secured to the rear anchor structure 20.

The reinforcing cables 22A, 22B, 22C, 22D extend between the front and rear anchor structures 18, 22 and through the cable guides 34A, 34B, 34C, 34D formed in the supports. The cables 22A, 22B, 22C, 22D, anchor structures 18, 20, and cable guides 34A, 34B, 34C, 34D help maintain the initial, upright, non-crash position of the supports 12 and keep them from rotating about their vertical axes or falling down when moving rearward responsive to a frontal impact on the crash cushion or moving sideways responsive to a side impact so as to facilitate controlled collapse of the supports and/or redirection of a vehicle during vehicle impacts.

Figure 2:
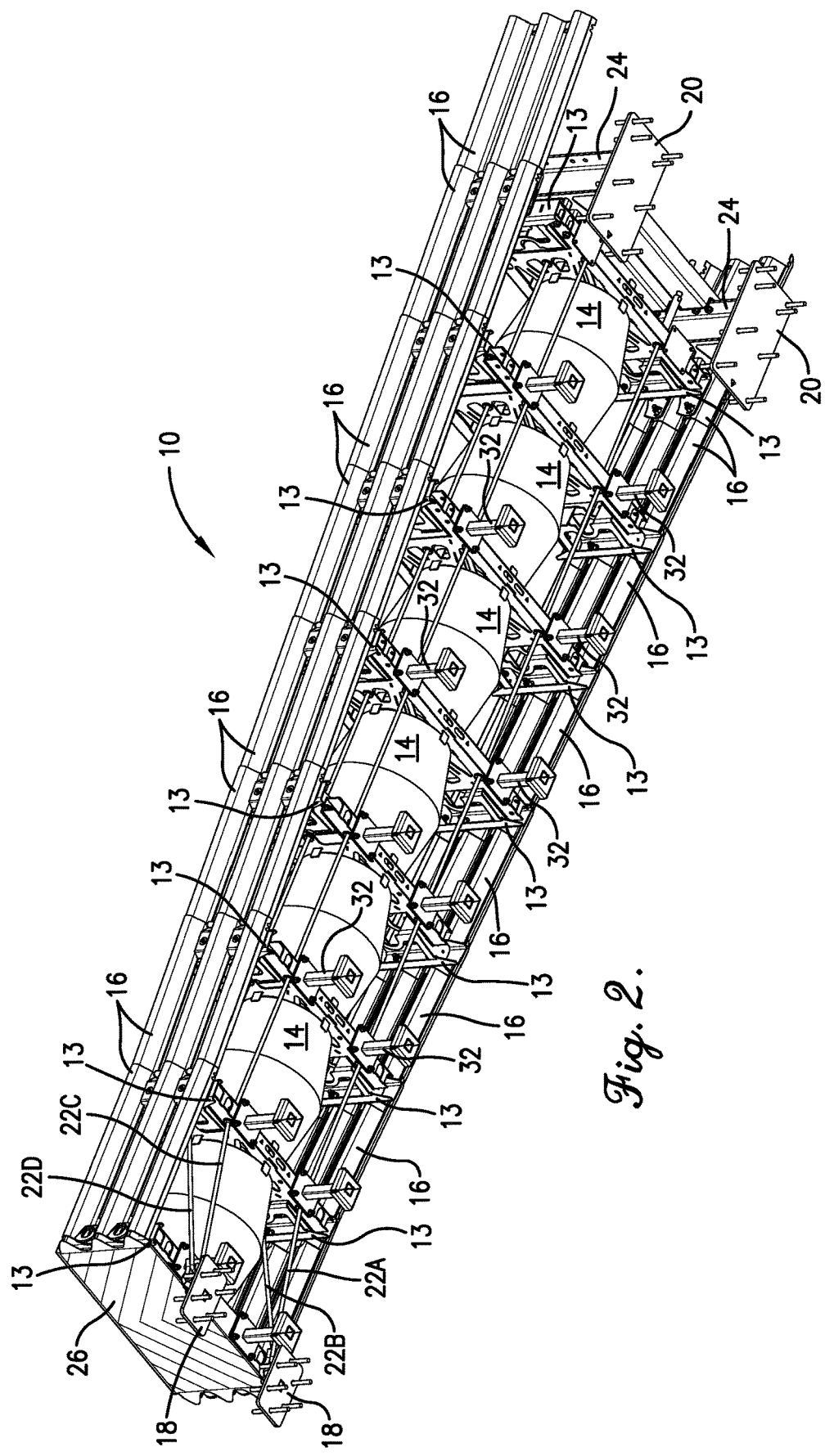
FIG. 2 is a bottom perspective view of the crash cushion.
Figure 5:
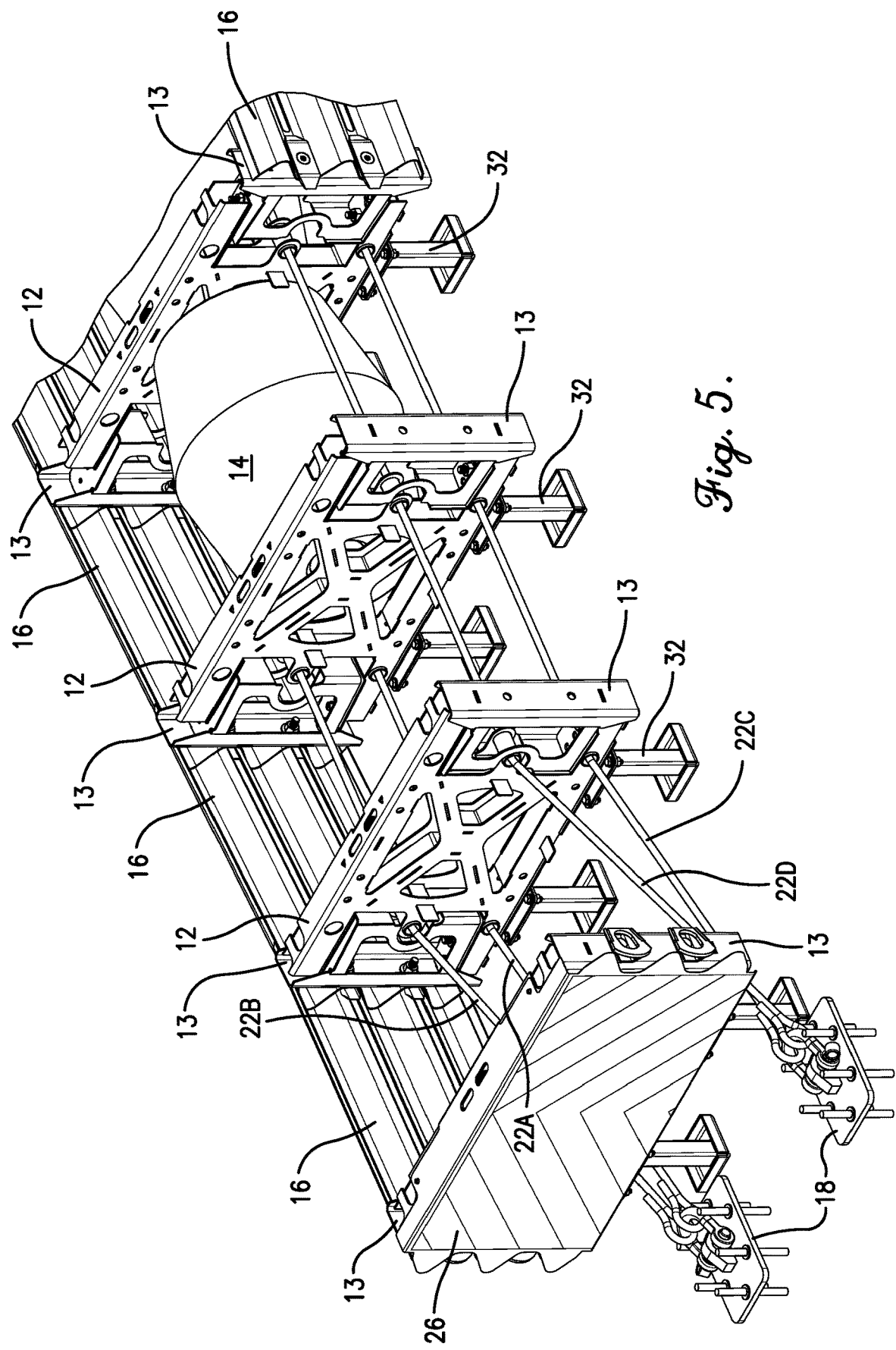
FIG. 5 is a partial top perspective view of a front portion of the crash cushion with some of its components removed.

An embodiment of the crash cushion comprises 4 separate reinforcing cables, with a pair of cables on each side of the crash cushion. As best shown in FIGS. 2, 3, and 6, the crash cushion includes a lower left side cable 22A, an upper left side cable 22B, a lower right side cable 22C, and an upper right side cable 22D.

The lower left side cable 22A is affixed to the front anchor structure 18 and the rear anchor structure 20 and extends through the lower left side cable guides 34A in the supports 12. Likewise, the lower right side cable 22C is also affixed to the front anchor structure 18 and the rear anchor structure 20 and extends through the lower right side cable guides 34C.

The upper left side cable 22B is affixed to the front anchor structure 18 and the rear anchor structure 20 and extends through the upper left side cable guides 34B in the supports. Likewise, the upper right side cable 22D is affixed to the front anchor structure 18 and the rear anchor structure 20 and extends through the upper right side cable guides 34D.

Figure 7:
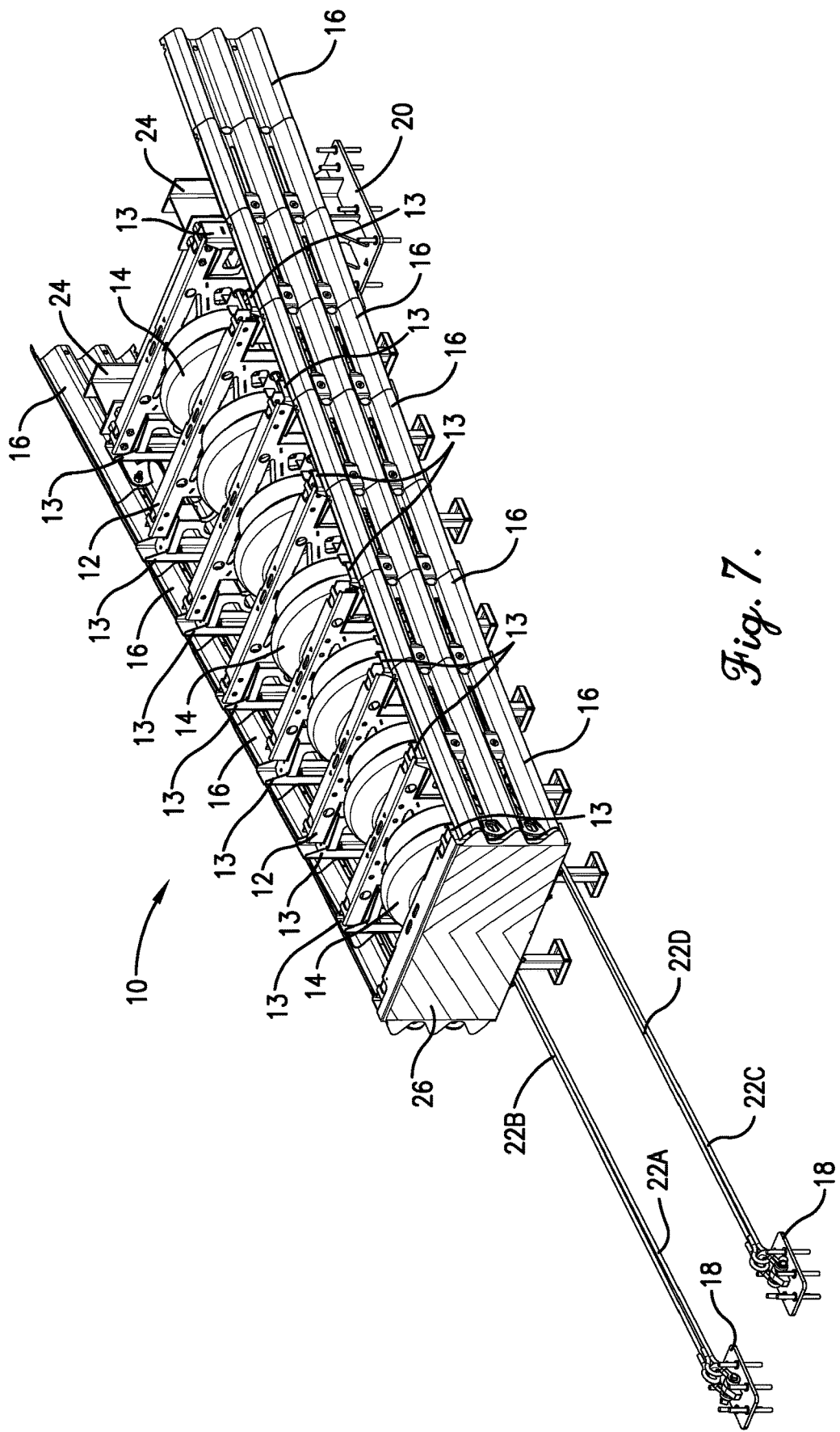
FIG. 7 is a top perspective view of the crash cushion in a collapsed state.
Figure 8:
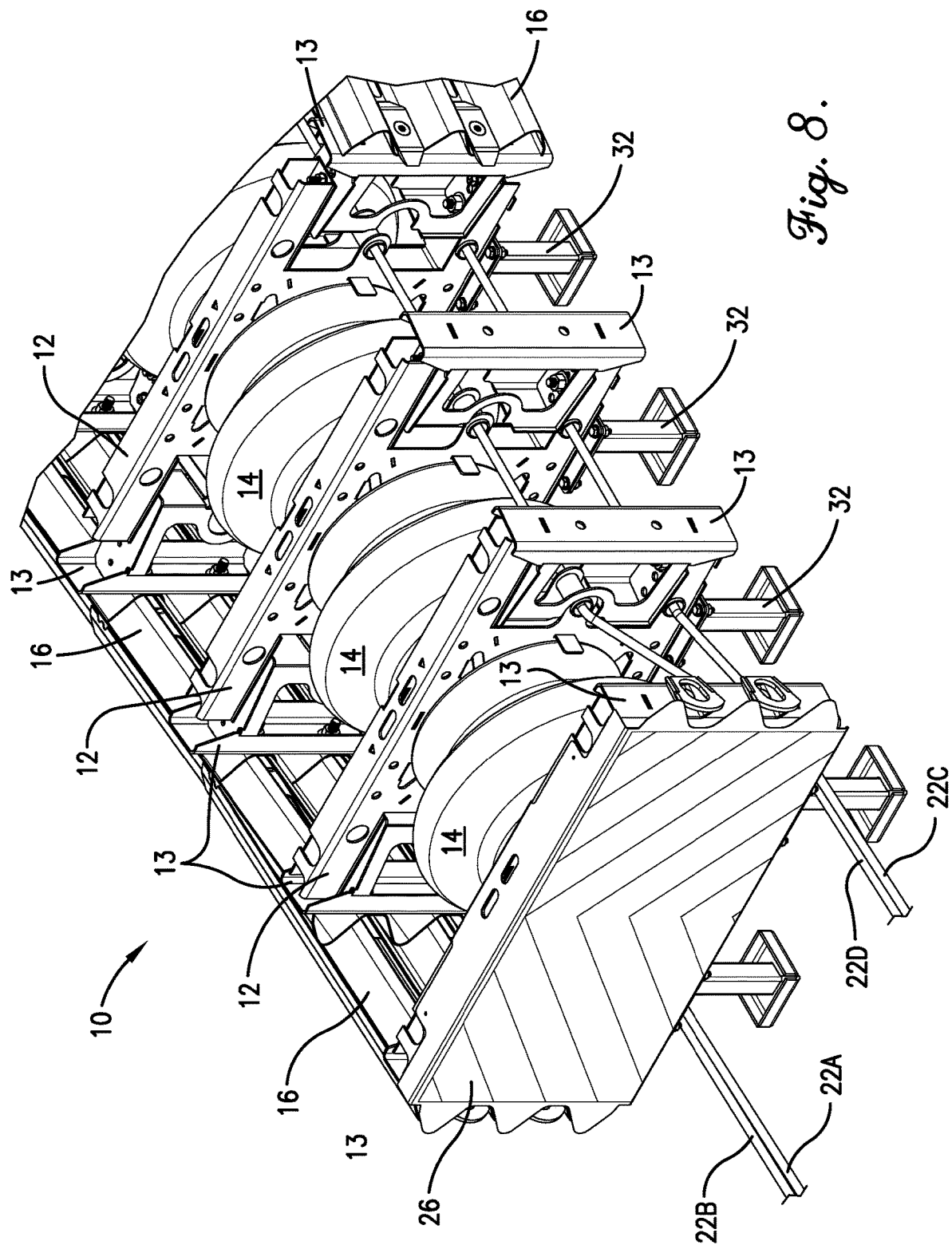
FIG. 8 is a partial top perspective view of the crash cushion in its collapsed state with some of its components removed.

FIGS. 7 and 8 illustrate the crash cushion 10 in a collapsed state after experiencing a frontal impact force, as for example caused by vehicle impact. As shown, the nose 26, supports 12, and side panels 16 telescopically collapse toward the immovable support frame 24, and each of the modules 14 collapses upon itself. The first module to collapse will be the forward most module. The modules disposed behind the front or forward most module will collapse in a generally accordion fashion, providing significantly greater resistance to the impact. As the supports 12 shift rearwardly toward the immovable support frame 24, they slide relative to, and are supported by, the reinforcing cables 22A, 22B, 22C, 22D.

In accordance with important aspects of the present invention, the crash cushion 10 also includes indexing structure that permits each hinge 13 to be selectively mounted in several different positions with respect to its support 12. The indexing structure includes strategically positioned holes in the supports 12, corresponding holes in the hinges 13, and bolts, pins, or other fasteners for connecting different aligned combination of the holes.

An embodiment of the indexing structure for one hinge 13 and one corresponding support 12 is shown in FIGS. 15-17. The indexing structure includes a pivot hole 46 in the upper hinge post 36 of the support 12 and a vertically aligned pivot hole 48 in the corresponding lower hinge post 38 of the support. The indexing structure further includes several spaced pivot holes 50, 52, 54 in the upper hinge mounting surface 40 of the hinge 13 and corresponding pivot holes 56, 58, 60 in the lower hinge mounting surface 42 that are vertically aligned with the pivot holes 50, 52, 54. In the illustrated embodiment, the indexing structure includes three aligned pairs of pivot holes in the hinge and one aligned pair of pivot holes in the hinge posts, but the indexing structure may have any number of pivot holes in the supports and hinge. The illustrated indexing structure further comprises a bolt 62, pin or other mechanism for joining aligned holes in the upper hinge post 36 and the upper hinge mounting surface 40 and a bolt 64, pin, or other mechanism for joining aligned holes in the lower hinge post 38 and the lower hinge mounting surface 42.

The indexing structure permits the hinge 13 to be mounted in three different positions relative to the support 12. In a first innermost position shown in FIGS. 10 and 11, the hinge 13 is pushed nearly all the way in between the opposed upper and lower hinge posts 36, 38. The pivot hole 46 in the upper hinge post 36 is then aligned with the pivot hole 54 in the upper hinge mounting surface 40, and the bolt 62, hinge pin, or other mechanism is inserted through the aligned pivot holes 46, 54 and secured with a nut. Likewise, the pivot hole 48 in the lower hinge post 38 is aligned with the pivot hole 60 in the lower hinge mounting surface 42, and the bolt 64 or other hinge pin is inserted through the aligned pivot holes 48, 60 and secured with a nut. In this position, the side panel mounting surface 44 of the hinge 13 is closest to the support for mounting side panels in innermost positions.

Figure 12:
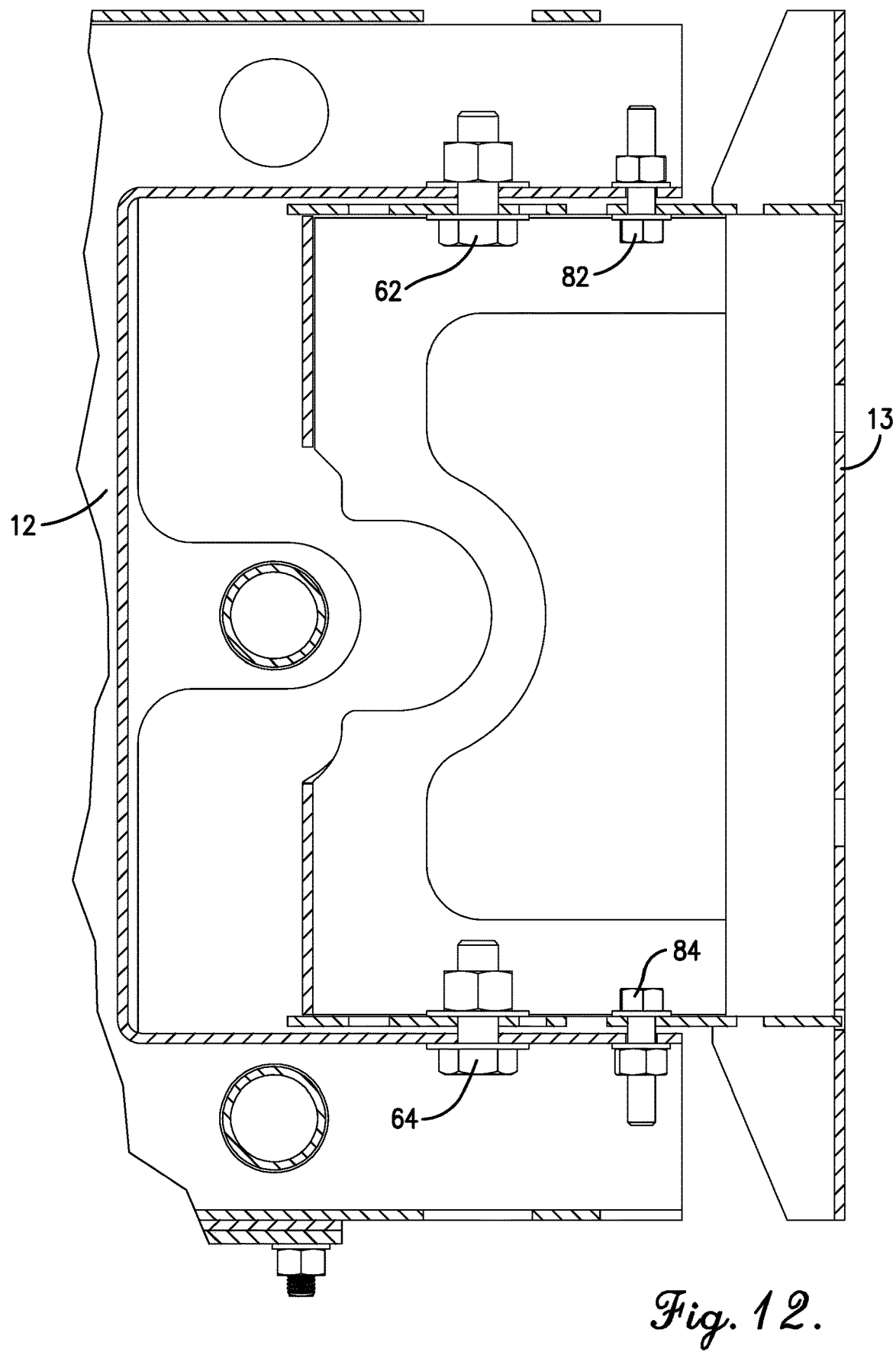
FIG. 12 is a vertical sectional view of one of the hinges shown mounted in an intermediate position with respect to its support.

In a second intermediate position shown in FIG. 12, the hinge 13 is pulled out about 1-3" from the support. The pivot hole 46 in the upper hinge post 36 is then aligned with the pivot hole 52 in the upper hinge mounting surface 40, and the bolt 62 is inserted through the aligned pivot holes 46, 52 and secured with a nut. Likewise, the pivot hole 48 in the lower hinge post 38 is aligned with the pivot hole 58 in the lower hinge mounting surface 42, and the bolt 64 is inserted through the aligned pivot holes 48, 58 and secured with a nut. In this position, the side panel mounting surface 44 of the hinge 13 is spaced about 1-3" from the support for mounting side panels in intermediate positions.

Figure 13:
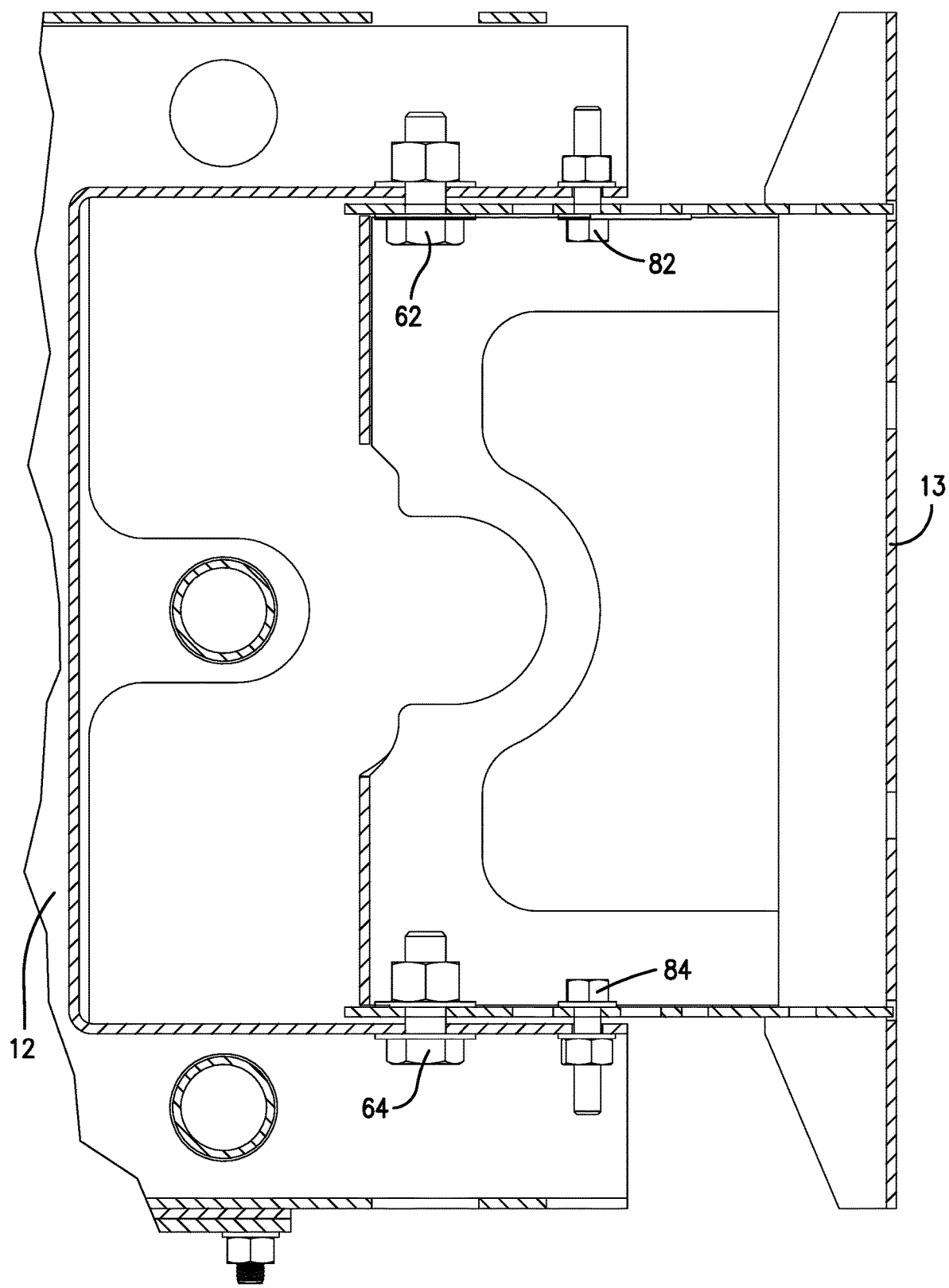
FIG. 13 is a vertical sectional view of one of the hinges shown mounted in an outermost position with respect to its support.

In a third outermost position shown in FIG. 13, the hinge 13 is pulled out about 3-6" from its support. The pivot hole 46 in the upper hinge post 36 is then aligned with the pivot hole 50 in the upper hinge mounting surface 40, and the bolt 62 is inserted through the aligned pivot holes 46, 50 and secured with a nut. Likewise, the pivot hole 48 in the lower hinge post 38 is aligned with the pivot hole 56 in the lower hinge mounting surface 42, and the bolt 64 is inserted through the aligned pivot holes 48, 56 and secured with a nut. In this position, the side panel mounting surface 44 of the hinge 13 is spaced about 3-6" from the support for mounting side panels in outermost positions.

The alternative mounting positions of the hinges 13 provided by the indexing structure reduces the number of unique width supports 12 required. For example, in the embodiment illustrated in FIG. 1, the three supports closest to the front of the crash cushion may be the same width, with the hinges of the first support mounted in their innermost positions, the hinges of the second support mounted in their intermediate positions, and the hinges on the third support mounted in their outermost positions. Likewise, the next three supports toward the rear of the crash cushion may be the same width, with the hinges of the first support mounted in their innermost positions, the hinges of the second support mounted in their intermediate positions, and the hinges on the third support mounted in their outermost positions.

In accordance with another important aspect of the invention, the crash cushion also includes angle set structure that allows the hinges 13 to pivot relative to the supports 12 up to a defined pivot range. The limited pivoting allows the side panels 16 to flare outwardly from the front of the crash cushion to the back to accommodate the overall wedge-shape of the crash cushion and to accommodate the overlapping edges of the side panels. The hinges and their angle set structure also facilitate controlled stacking of the side panels when the crash cushion collapses upon itself when subjected to a frontal vehicle impact.

The angle set structure includes strategically positioned holes in the supports, corresponding holes in the hinges, and bolts, pins, or other fasteners for connecting the holes. An embodiment of the angle set structure for one hinge and one corresponding support is shown in FIGS. 15-17. The illustrated angle set structure includes an oblong angle set hole 66 in the upper hinge post 36, a vertically aligned oblong angle set hole 68 in the lower hinge post 38, spaced angle set holes 70, 72, 74 in the upper hinge mounting surface 40, corresponding angle set holes 76, 78, 80 in the lower hinge mounting surface 42, that are vertically aligned with the angle set holes 70, 72, 74 and bolts 82, 84, pins, or other for joining aligned holes as described below.

When the hinge 13 is in its innermost position described above, the angle set hole 66 in the upper hinge post 36 is aligned with the angle set hole 74 in the hinge. The bolt 82, pin or other mechanism is then inserted through the aligned angle set holes 66, 74 and secured with a nut. Likewise, the angle set hole 68 in the lower hinge post 38 is aligned with the angle set hole 80 in the hinge, and the bolt 84, pin, or other mechanism is inserted in the aligned holes and secured with a nut.

When the hinge 13 is in its intermediate position described above, the angle set hole 66 in the upper hinge post 38 is aligned with the angle set hole 72 in the hinge and the bolt 82, pin or other mechanism is inserted through the aligned angle set holes and secured with a nut. Likewise, the angle set hole 68 in the lower hinge post 38 is aligned with the angle set hole 78 in the hinge, and the bolt 84, pin, or other mechanism is inserted in the aligned holes and secured with a nut.

When the hinge is in its outermost position, the angle set hole 66 in the upper hinge post 36 is aligned with the angle set hole 70 in the hinge. The bolt 82, pin or other mechanism is then inserted through the aligned angle set holes 66, 70 and secured with a nut. Likewise, the angle set hole 68 in the lower hinge post 38 is aligned with the angle set hole 76 in the hinge, and the bolt 84, pin, or other mechanism is inserted in the aligned holes 68, 76 and secured with a nut.

Figure 14:
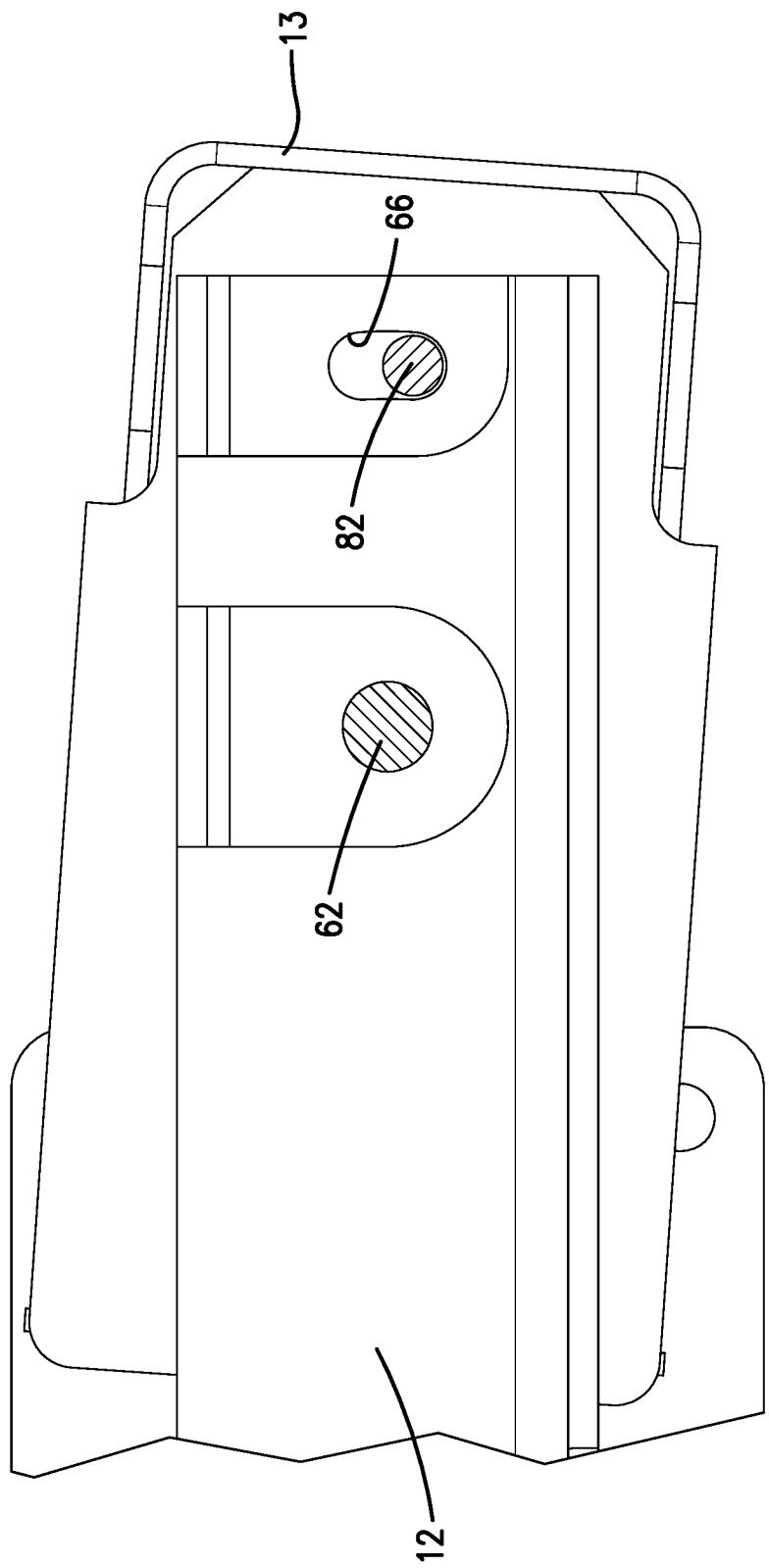
FIG. 14 is a partial top plan view of one of the supports and an associated hinge with their fasteners in section.

In all three positions, the angle set structure allows the hinge to pivot relative to its support up to the limit of pivot range provided by the angle set holes 66, 68 as best depicted in FIG. 14. In one embodiment, the angle set structure allows each hinge to pivot up to 15° in both directions. This allows the side panels to flare outwardly from the front of the crash cushion to the back to accommodate the overall wedge-shape of the crash cushion and to accommodate the overlapping edges of the side panels. The hinges also facilitate controlled stacking of the side panels when the crash cushion collapses upon itself when subjected to a frontal vehicle impact.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A crash cushion for absorbing vehicle impact energy, the crash cushion comprising:
   a plurality of supports each support comprising a central frame having left and right sides; an upper and lower hinge post on the right side of the central frame and an upper and lower hinge post on the left side of the central frame;
   a pair of hinges pivotally mounted on opposite sides of each support;

a plurality of energy absorbing modules disposed between and supported by the supports;

a plurality of side panels that interconnect the supports and envelop the energy-absorbing modules, each side panel being mounted to one of the hinges; and indexing structure that permits each hinge to be selectively mounted in at least two different positions relative to its support so as to mount the side panels in at least two different positions relative to their respective supports.

2. The crash cushion as set forth in claim 1, wherein the indexing structure includes a pivot hole in each of the upper hinge posts and a pivot hole in each of the lower hinge posts.

3. The crash cushion as set forth in claim 2, wherein the pivot hole in each of the upper hinge posts is vertically aligned with the pivot hole in each of the lower hinge posts.

4. The crash cushion as set forth in claim 3, wherein each hinge comprises upper and lower hinge mounting surfaces.

5. The crash cushion as set forth in claim 4, wherein the indexing structure includes spaced pivot holes in the upper hinge mounting surface of each hinge.

6. The crash cushion as set forth in claim 5, wherein the indexing structure further includes spaced pivot holes in the lower hinge mounting surface of each hinge that are vertically aligned with the spaced pivot holes in the upper hinge mounting surface of each hinge.

7. The crash cushion as set forth in claim 1, further comprising;

front anchor structure;

rear anchor structure spaced from the front anchor structure, the energy absorbing modules and the supports being positioned between the front anchor structure and the rear anchor structure;

a left side cable affixed to the front anchor structure and the rear anchor structure and extending through cable guides in the supports; and a right-side cable affixed to the front anchor structure and the rear anchor structure and extending through the cable guides in the supports.

8. The crash cushion as set forth in claim 1, further comprising angle set structure that defines a pivot range of each hinge with respect to its corresponding support.

9. The crash cushion as set forth in claim 8, wherein the angle set structure is in each support and each hinge.

10. A crash cushion for absorbing vehicle impact energy, the crash cushion comprising:

a plurality of supports, each support comprising a central frame having left and right sides, an upper and lower hinge post on the right side of the central frame, and an upper and lower hinge post on the left side of the central frame;

a plurality of hinges, each of the hinges pivotally mounted between one pair of the upper and lower hinge posts;

a plurality of energy absorbing modules disposed between and supported by the supports;

a plurality of side panels that interconnect the supports and envelop the energy-absorbing modules, each side panel being mounted to one of the hinges; and indexing structure in each support and each hinge that permits each hinge to be selectively mounted in at least three different positions relative to its respective support so as to mount the side panels in at least three different positions relative to their respective supports.

11. The crash cushion as set forth in claim 10, wherein the indexing structure includes a pivot hole in each of the upper hinge posts and a vertically aligned pivot hole in each of the lower hinge posts.

12. The crash cushion as set forth in claim 11, wherein each hinge comprises upper and lower hinge mounting surfaces, and wherein the indexing structure includes three spaced pivot holes in the upper hinge mounting surface of each hinge and three spaced pivot holes in the lower hinge mounting surface of each hinge that are vertically aligned with the three spaced pivot holes in the upper hinge mounting surface.

13. The crash cushion as set forth in claim 10, further comprising angle set structure in each support and each hinge that defines a pivot range of each hinge with respect to its corresponding support.

14. The crash cushion as set forth in claim 13, wherein the indexing structure further includes a plurality of upper hinge pins, each upper hinge pin inserted through the pivot hole in one of the upper hinge posts and one of the spaced pivot holes in one of the upper hinge mounting surfaces.

15. The crash cushion as set forth in claim 14, wherein the indexing structure further includes a plurality of lower hinge pins, each lower hinge pin inserted through the pivot hole in one of the lower hinge posts and one of the spaced pivot holes in one of the lower hinge mounting surfaces.

16. The crash cushion as set forth in claim 10, wherein the indexing structure permits each hinge to be selectively positioned in an innermost position at which the hinge is closest to its corresponding support, an intermediate position, and an outermost position at which the hinge is spaced furthest from its corresponding support.

17. The crash cushion as set forth in claim 10, further comprising;

front anchor structure;

rear anchor structure spaced from the front anchor structure, the energy absorbing modules and the supports being positioned between the front anchor structure and the rear anchor structure;

a left side cable affixed to the front anchor structure and the rear anchor structure and extending through the cable guides in the supports; and a right-side cable affixed to the front anchor structure and the rear anchor structure and extending through the cable guides in the supports.

18. A crash cushion for absorbing vehicle impact energy, the crash cushion comprising:

a plurality of supports, each support comprising a central frame having left and right sides, an upper and lower hinge post on the right side of the central frame, and an upper and lower hinge post on the left side of the central frame;

a plurality of hinges, each of the hinges pivotally mounted between one pair of the upper and lower hinge posts;

a plurality of energy absorbing modules disposed between and supported by the supports;

a plurality of side panels that interconnect the supports and envelop the energy-absorbing modules, each side panel being mounted to one of the hinges;

indexing structure that permits each hinge to be selectively mounted in at least three different positions relative to its respective support so as to mount the side panels in at least three different positions relative to their respective supports; and angle set structure that defines a pivot range of each hinge with respect to its corresponding support.

* * * * *